US005632624A

United States Patent [19]
Cameron et al.

[11] Patent Number: 5,632,624
[45] Date of Patent: May 27, 1997

[54] ELECTRONIC STUDY GUIDE

[75] Inventors: Jeffrey Cameron, Naples, Fla.; Evan H. Sohn, New York, N.Y.; David Maurer, Randolph, N.J.

[73] Assignee: Brainchild, Inc., Naples, Fla.

[21] Appl. No.: 125,326

[22] Filed: Sep. 22, 1993

[51] Int. Cl.$^6$ ........................................ G09B 3/00
[52] U.S. Cl. .................. 434/322; 434/308; 434/309; 434/317
[58] Field of Search ........................ 434/308, 309, 434/317, 322, 323, 327, 332, 335, 365

[56] References Cited

U.S. PATENT DOCUMENTS

| | | | |
|---|---|---|---|
| 3,981,087 | 9/1976 | Sachs | 434/308 |
| 4,486,180 | 12/1984 | Riley . | |
| 4,593,904 | 6/1986 | Graves | 434/332 X |
| 4,684,349 | 8/1987 | Ferguson et al. | 434/308 |
| 4,820,167 | 4/1989 | Nobles et al. . | |
| 5,035,625 | 7/1991 | Munson et al. | 434/332 |
| 5,178,545 | 1/1993 | Thompson . | |
| 5,204,813 | 4/1993 | Samph et al. . | |
| 5,219,291 | 6/1993 | Fong et al. | 434/335 X |

*Primary Examiner*—Jerome Donnelly
*Assistant Examiner*—Glenn E. Richman
*Attorney, Agent, or Firm*—Kane, Dalsimer, Sullivan, Kurucz, Levy, Eisele and Richard, LLP

[57] ABSTRACT

A study guide includes a housing with a screen and a removable cartridge. The cartridge provides textual material including a plurality of questions and a set of answers for each question. The textual material is displayed on the screen and the user then selects one of the answers in response to each question. A microprocessor in the housing tabulates the answers and on demand displays a score of the total number of questions and/or the number of correct answers.

15 Claims, 8 Drawing Sheets

1. BASED ON THE NORMAL PHYSIOLOGIC
CHANGES THAT OCCUR DURING PREGNANCY, THE } 64
NURSE WOULD EXPECT MRS. ABRAHMS' INSULIN
REQUIREMENTS TO:

A - INCREASE IN THE POSTPARTAL PERIOD } 68

B - REMAIN STABLE DURING PREGNANCY } 70

C - INCREASE IN THE LATER PART OF PREGNANCY } 66

D - DECREASE THROUGHOUT THE PERINATAL } 72
    PERIOD

PRESS E TO SEE SITUATION          1/40      } 84

FIG. 8

ELECTRONIC STUDY GUIDE

BACKGROUND OF THE INVENTION a. Field of Invention

This invention pertains to a hand-held apparatus useful for studying various subjects and more particularly to a hand-held apparatus suited for studying interactively a subject and for training a person in taking examinations in that subject by reviewing the subject in a multiple choice learning environment: through three modes: study, cram and test.

b. Description of the Prior Art

Written examinations for testing people in various subjects using multiple choice questions are in wide spread use today. Such examinations are prerequisites in the licensing process of various professional careers as well as for admission in various schools and universities. Two methods are used by people to train for these examinations, either informally or as part of special preparatory courses: the study and review of prosaic materials including textbooks, notebooks, videos and so on, related to and are more specific subjects and the taking of tests under conditions designed to simulate actual written examinations as closely as possible. Until the present invention there were no means available to combine the two methods or to perform the first method using automated means. While computer programs have been written for the second method, these programs were suited to be run only on desk-top or at most personal computers and did not accurately simulate actual examination conditions. In addition, the computers are relatively expensive and even the so-called portable PCs are too large to be used comfortably anywhere but on a desk.

OBJECTIVES AND SUMMARY OF THE INVENTION

In view of the above-mentioned disadvantages of the prior art, it is an objective of the present invention to provide a study guide which allows accurate self-evaluation with scores, and also remedial activities, including reviewing mistakes and accessing the rationales for the correct and incorrect answers.

Another objective is to provide an apparatus which for the first time combines both the prosaic texts and the testing materials in a single test study guide.

A further objective is to provide an apparatus which is programmable so that it can be changed and even reconfigured for a large variety of subjects using the same hard- and firm-ware.

Yet a further objective is to provide an apparatus with a large latitude of flexibility so that it can be used easily for a large variety of tests, whereby individual test material or test-taking devices are not necessary for each test type.

Other objectives and advantages shall become apparent from the following description. Briefly, the subject invention consists of a housing constructed and arranged to fit in a person's hand comfortably and without resorting to any external support devices. Preferably, the apparatus is electrically self-sufficient, i.e. it derives its operating power from a battery and/or an AC adapter. The housing includes a face with a screen for displaying instructions, narrative text, and other material associated with the studying process as described more fully below. The housing also includes selection means for selecting one of a plurality of operating modes of the apparatus and for selecting answers to questions.

The narrative text and a substantial portion of the program for the apparatus is stored in a removable cartridge for dedicating the apparatus to provide study material and administer to a person an examination in a preselected subject and to permit the person to study independently, at his or her own pace and remediate lack of knowledge, thereby becoming educated. Each cartridge also includes a particular set of textual material, a set of questions associated with the material, a set of answers, and a set of explanatory texts for explaining why a particular answer was correct or incorrect. References to sources of information may also be included on the cartridge. These references may include titles of text with specific page numbers so that students can be directed quickly to specific, related areas of information for further study. A different cartridge may be designed for each subject. The information may be stores on EPROM's, PROM's or masked ROM's.

DESCRIPTION OF THE FIGURES

FIG. 8 shows the screen displaying a question and several answers.

DETAILED DESCRIPTION OF THE INVENTION

Figure 1:
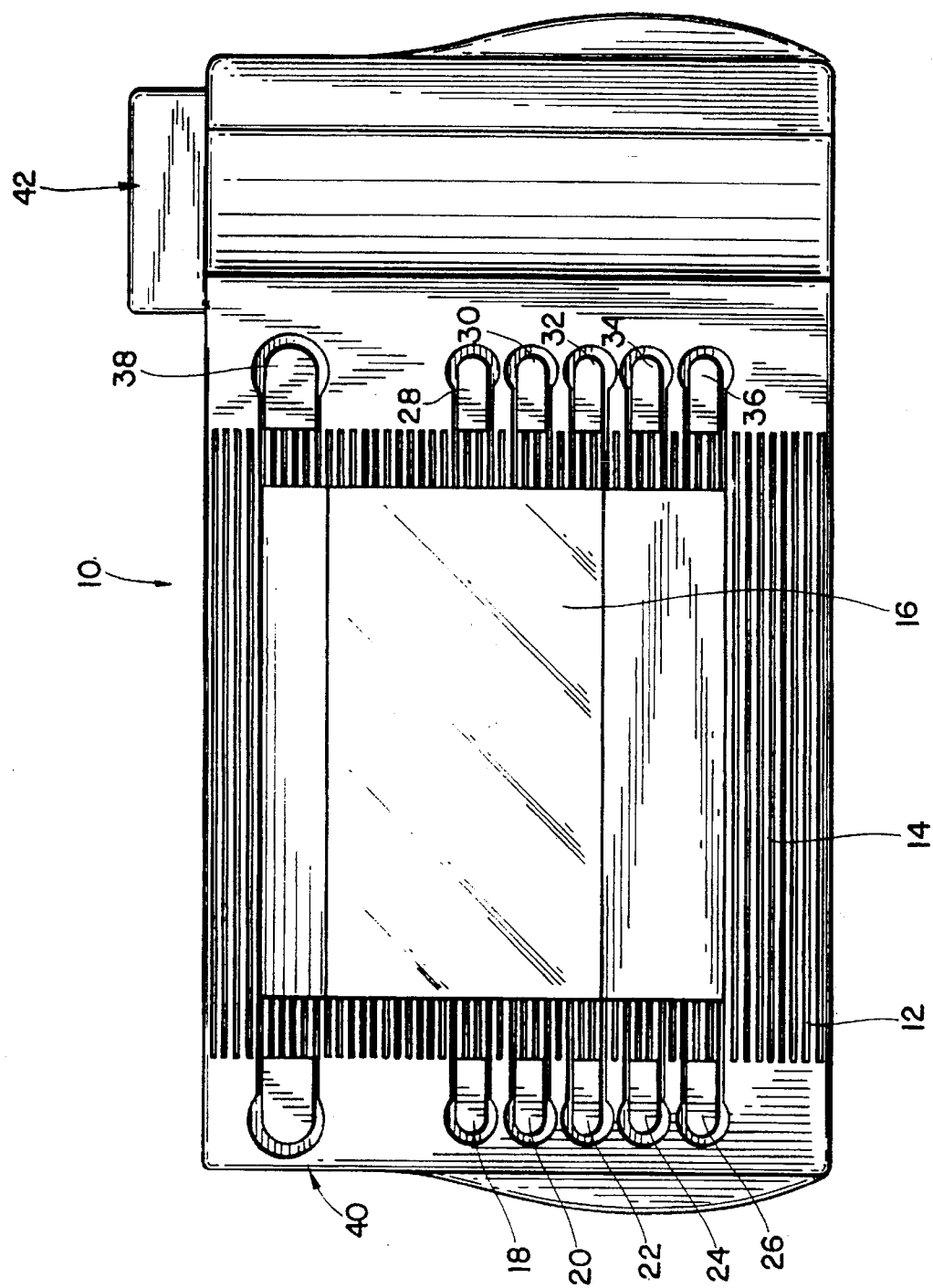
FIG. 1 shows a plan view of an apparatus constructed in accordance with this invention.

Referring now to the Figures, the present invention includes an apparatus 10, with a housing 12 having a front panel 14. A screen 16 which may be for example, an LCD display having 24 rows and 40 columns, is mounted inside the housing so that it is visible on the front. Also mounted on the front panel, preferably aligned on either side of display 16 are two rows of momentary pushbuttons one row consisting of buttons 18, 20, 22, 24 and 26 is disposed on the left side of the screen 16 and are used to select answers to particular questions, to provide commands in response to requests for instructions and so forth. These buttons are labeled sequentially, for example, by letters A, B, C, D, E and/or by numbers respectively. The other row consisting of buttons 28, 30, 32, 34 and 36 is disposed on the right side of screen 16 and used for manipulating the text. In addition, two more push button, 38, 40 are provided near the top corners of the screen 16. Button 40 is a HIGHLIGHT button and button 38 is a SCORE button. The function of these buttons is as explained below. Alternatively, some or all of the buttons may be replaced by using a touch sensitive screen. Finally, the apparatus is also provided with an ON/OFF switch 52 (shown in FIG. 2).

A cartridge 42 is removably mounted in a slot formed in one of the side, of housing 12. Cartridge 42 can be removed and replaced with another cartridge without opening the housing 12.

Figure 2:
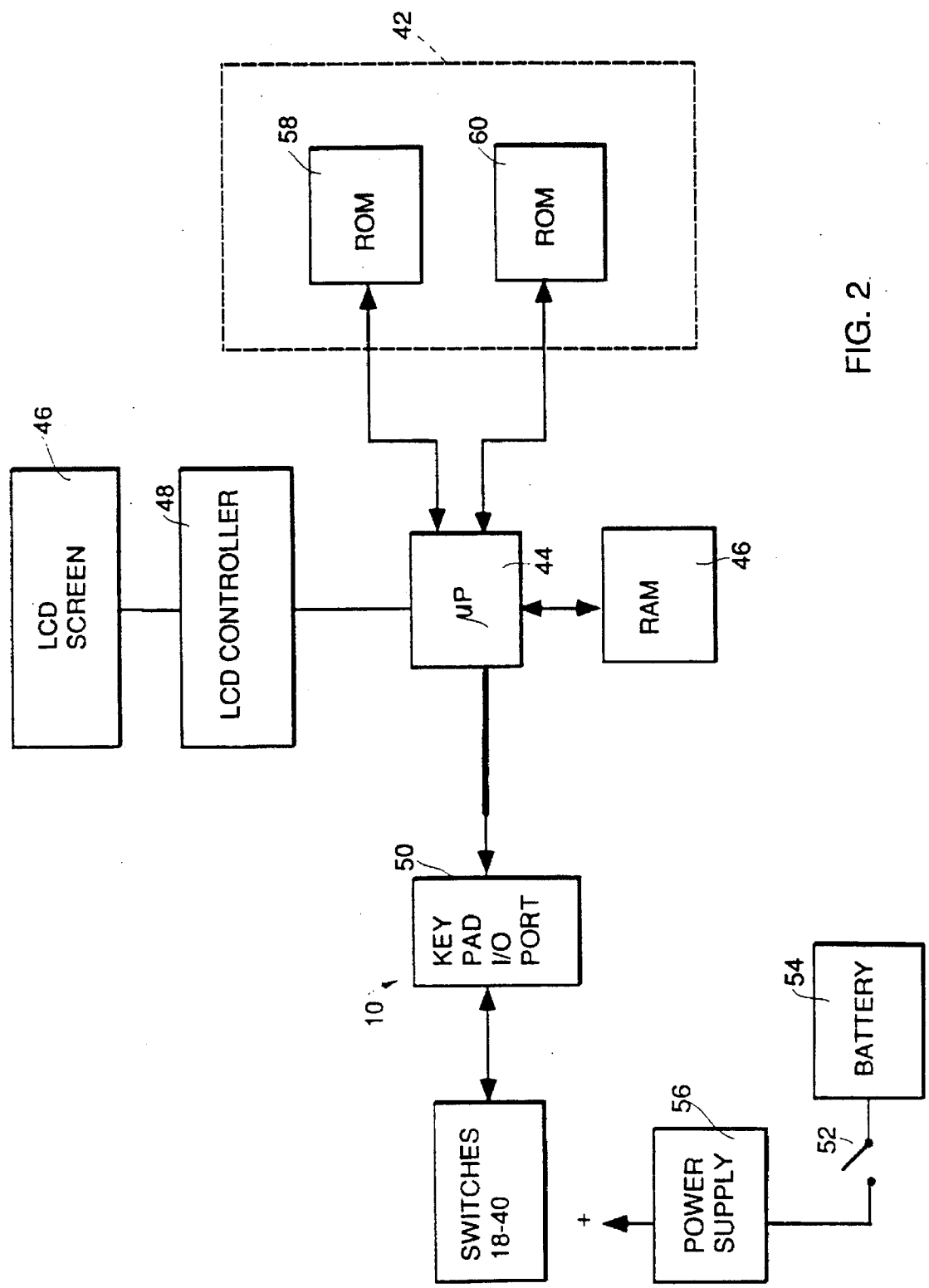
FIG. 2 shows a block diagram for an apparatus.

As shown in FIG. 2, the apparatus 10 also includes a microprocessor 44 and associated electronic components, including a RAM 46, an LCD controller 48, and keypad I/O port 50. Power to these electronic components is provided by one or more batteries 54, switch 52 and power supply circuit 56. All these components are disposed inside housing 12.

Associated with microprocessor 44 are two ROMs 58, 60 disposed in cartridge 42. ROM 58 contains a program defining a sequence of operations for the apparatus 10 to be performed by the microprocessor 44, while ROM 60 contains textual material. Of course if desired, a single ROM may be provided in cartridge 42 for both functions.

The microprocessor reads the program from ROM 58, displays instructions and other textual material on display 16 through controller 48 and receives various responses and/or commands from switches 18–40 through keypad I/O port 50.

Figure 3:
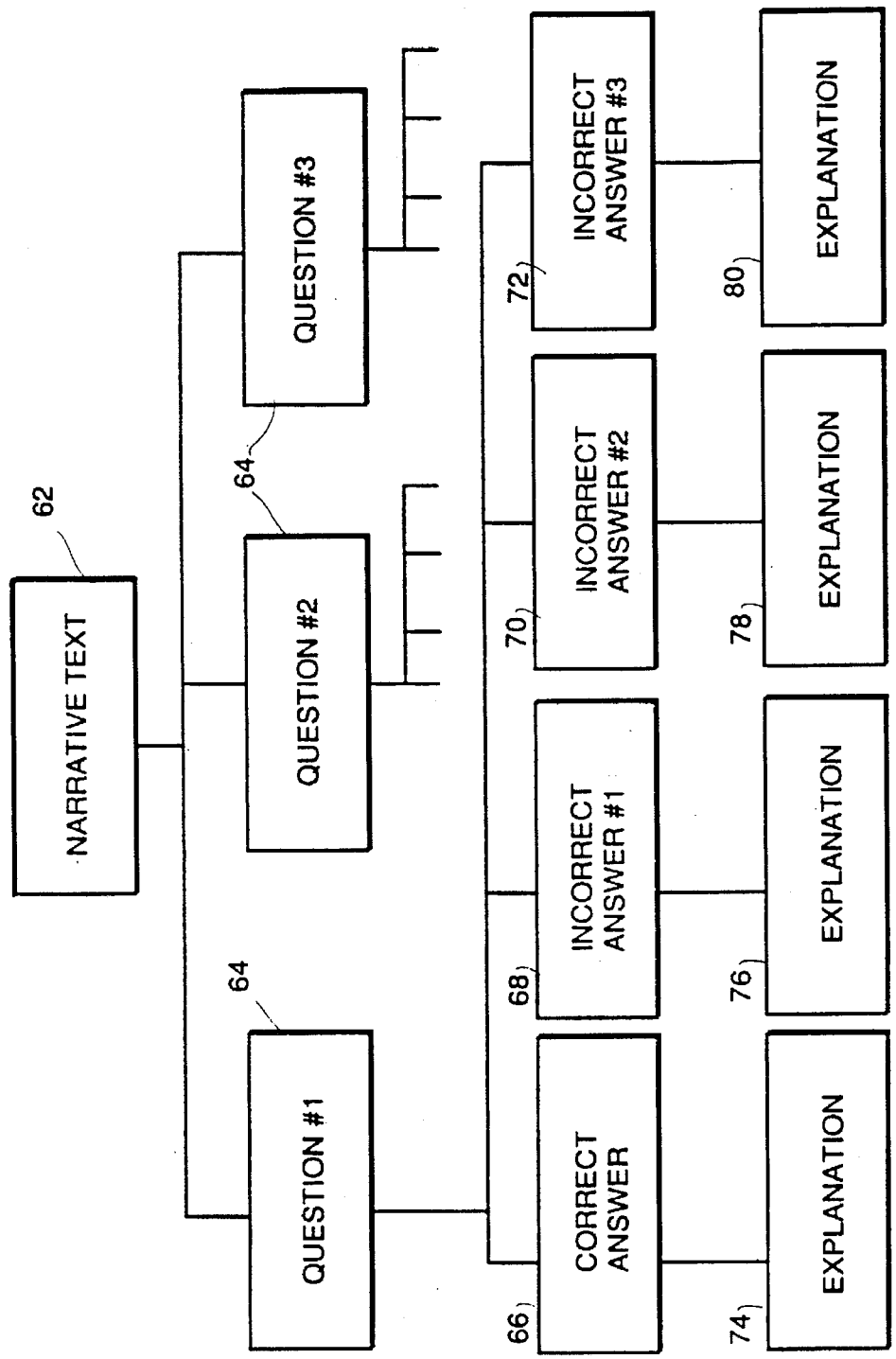
FIG. 3 shows a schematic representation of how textual material is organized for the subject apparatus.

The textual material in ROM 60 may consists of several components, depending mainly on the subject for which the cartridge 42 is designated. For instance, as shown in FIG. 3, the textual material may include a narrative text 62 describing a particular set of circumstances or defining a problem or situation for the particular subject. Associated with each narrative text 62 there are a plurality of question texts 64. Associated with each question text 64 are a plurality of answers texts 66–72, only one of the answer texts, such as answer text 66 being correct, while the remaining answer texts 68–72 being incorrect. Associated with each answer is a corresponding explanation text 74–78.

Thus, a cartridge for the subject of medicine may contain a narrative text 62 which reads as follows:

Narrative Text 62

'Trudy Abrahms, a 25-year old gravida 3, para 0, abortion 1, has type III diabetes mellitus (gestational diabetes).'
Associated with this text 62 are several questions including the following:

Question Text 64

'Based on the normal physiologic changes that occur during pregnancy, the nurse would expect Mrs. Abrahms' insulin requirements to:'
Associated with the above Question Text 64 are the following answer texts:

Answer Text 66

'Increase in the later part of pregnancy.'

Answer Text 68

'Remain stable during pregnancy.'

Answer Text 70

'Increase in the postpartal period.'

Answer Text 72

'Decrease throughout the perinatal period.'
Associated with each answer text 66–72 is an explanation text. For example, associated with answer text 66, is the following:

Explanation Text 74

'After the twentieth week of pregnancy levels of HPL (Human Placental Lactogen), an insulin antagonist, increase; insulin requirements may double or quadruple by term gestation.'
Of course in some cases the narrative text 62 or the explanation texts 74–80 may be obvious from the question 64 and the answer texts and hence may be omitted.

Figure 4:
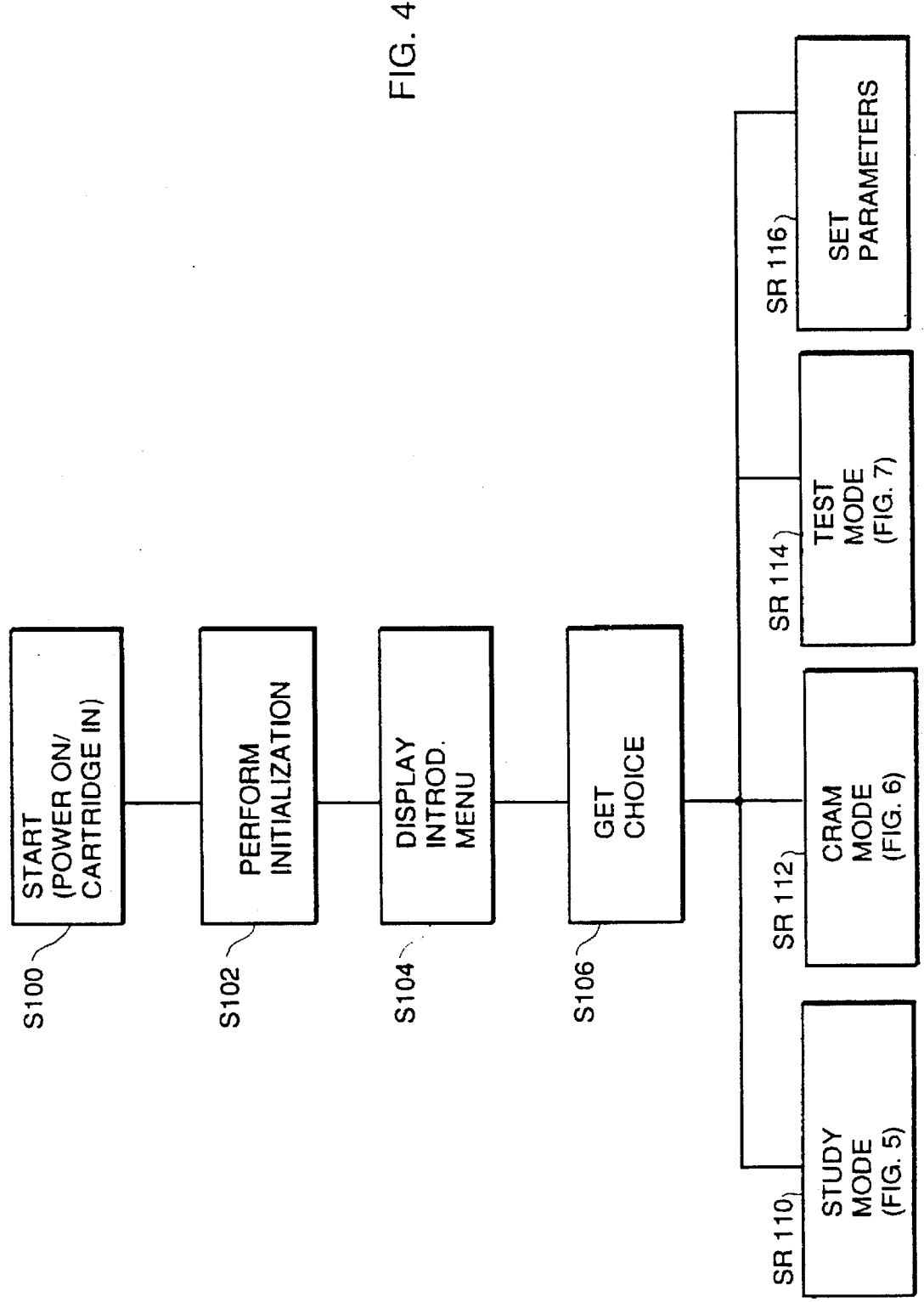
FIG. 4 shows a flow chart of the initial operation of the apparatus of FIG. 1.

The operation of the apparatus is described in the flow charts 4–7. As shown in FIG. 4, after power switch 52 is closed, the microprocessor 44 is initialized (step S 100) by the program in cartridge 42. Without the cartridge, the apparatus is disabled, or alternatively the microprocessor displays a message on screen 16 requesting that a cartridge 16 be inserted into its slot. In step S 102 the microprocessor performs various initialization procedures. In step S 104 the display 16 displays an introductory menu giving the user a choice of operating the apparatus in one of several modes including a study mode, a cram mode, a test mode, or to set certain operational parameters, such as, for example, the amount of time allotted for answering each question, the total amount of time allotted for a test and so forth. Each of these choices is displayed on screen 16, and the user may select one of the modes, for example by using one of the buttons 18–24.

Figure 6:
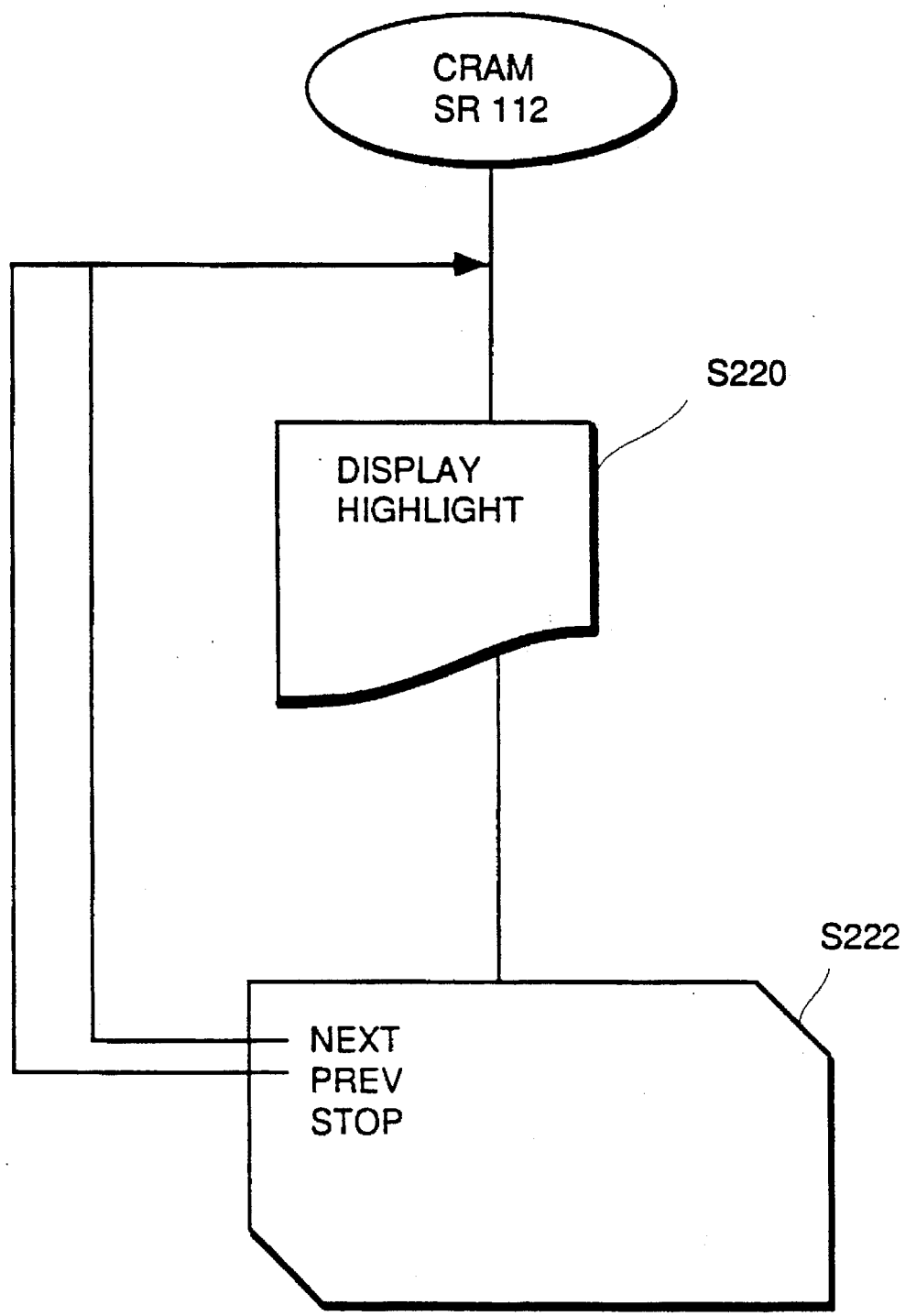
Figure 7:
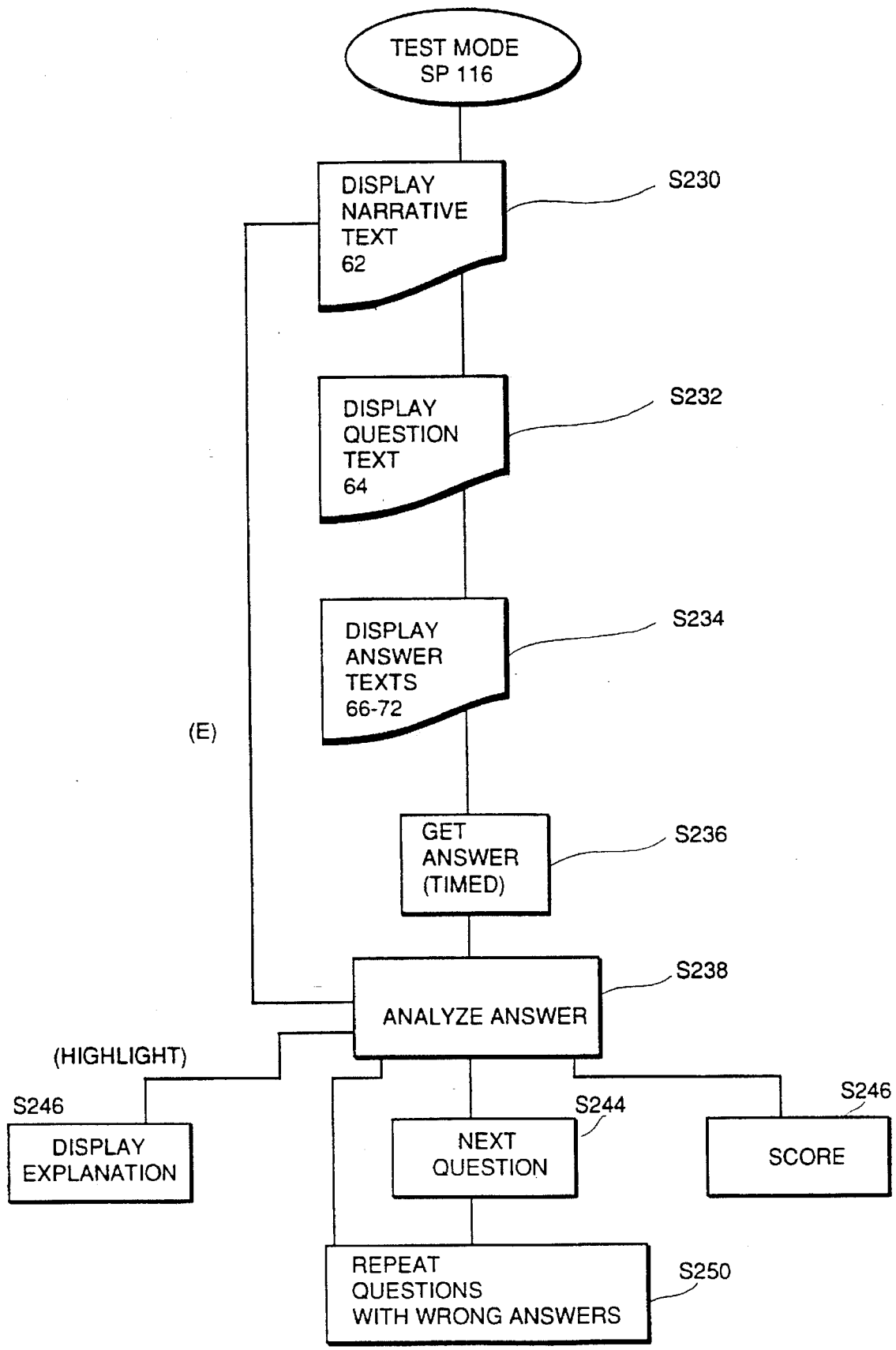

In step S 106 the option selected by user is received and the microprocessor enters into one of the corresponding subroutines SR 110, SR 112, SR 114 or SR 116. The flow charts for subroutines SR 110–114 are shown in FIGS. 5–7 respectively.

The contents of the various texts of FIG. 3 in effect form in essence a comprehensive study guide for the particular subject. Thus, the subject apparatus may be easily used as an actual study guide by selecting the study mode.

Figure 5:
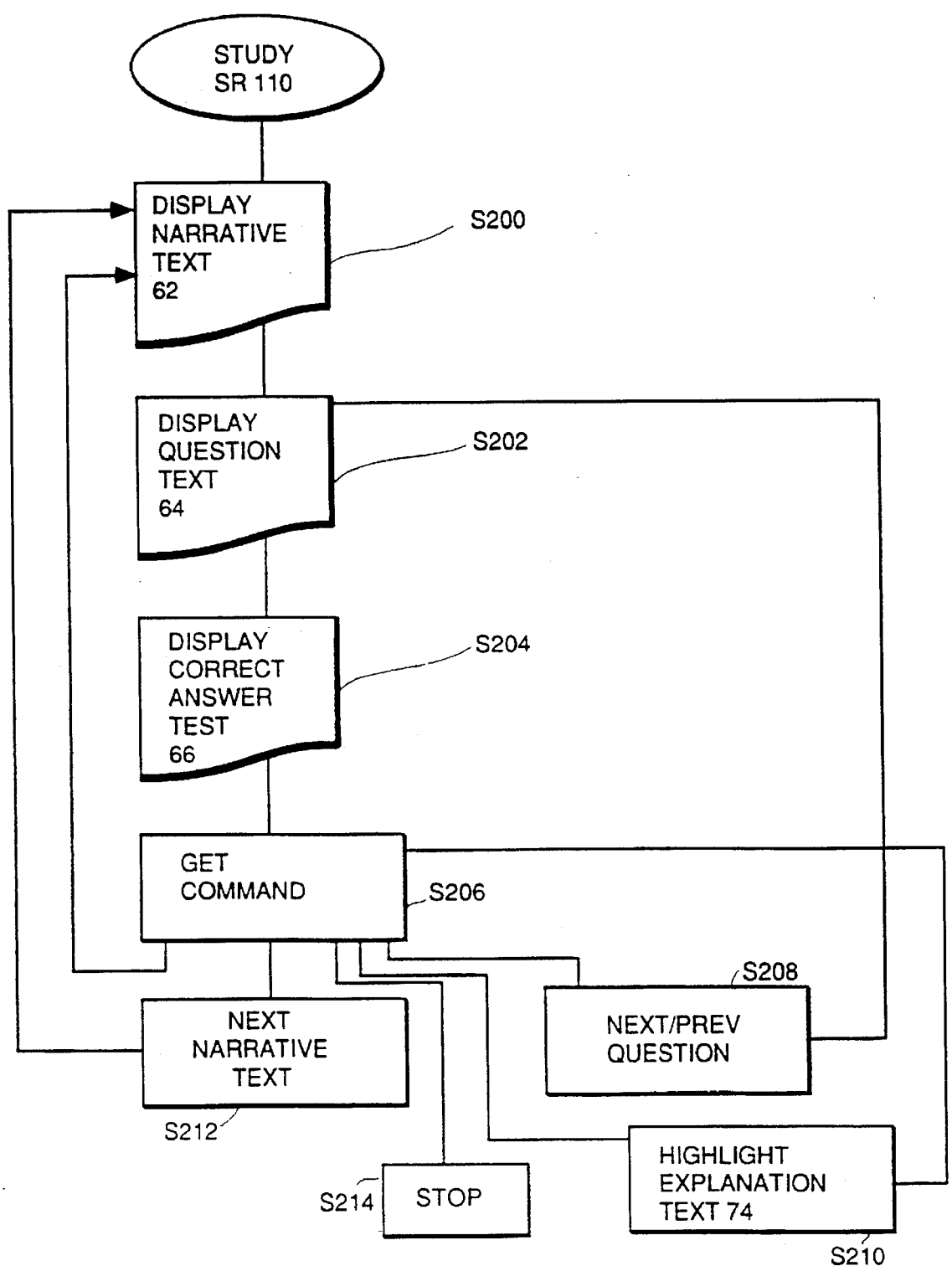
FIGS. 5–7 shows flow charts for the various modes of operation for the subject apparatus.

As shown in FIG. 5, when this mode is selected (SR 110), the first narrative text 62 is displayed (step S 200) followed by the first question text 66 (Step S 204). Preferably, the last line on screen 16 is saved for instructions for the user. After the text 62 has been read, the user pushes a button and a question text 64 is displayed together with the correct answer text 66 (S 202, S 204).

The apparatus then waits for a command from the user (step 206). The user may select to re-display the narrative text 62 in which case the microprocessor returns to S 200. The user may elect to display the previous or next question related to the same narrative text 62, in which case (S 208) the apparatus returns to S 202 with a new question and answer being displayed. The user may elect to explore the question further by viewing the explanation text 74 corresponding to the correct answer text 66. For this purpose he depresses the HIGHLIGHT button 40. (S 210) The user may also proceed to the next narrative text (S 212) or to stop the study session (S 214).

Another mode of operation is the cram mode in which the user quickly reviews the subject. When this mode is selected (SR 112, FIG. 6), the apparatus displays one of the explanation texts such as text 74. Thereafter the apparatus waits (S 222) for the user to either select the next explanation text, the previous explanation text or to stop, by pressing one of the buttons. In this mode the apparatus simulates electronically a plurality of flash cards on the subject, thus allowing quick review of the statements or questions with the correct answer displayed simultaneously.

Finally, the user may elect the test mode (SR 114). In this mode, first the narrative text 62 is displayed. When the user finished reading this text (indicated by pushing one of the designated buttons 18–40), the first question text 64 is displayed (S 232) followed by correct answer 66 and the incorrect answers 68, 70, 72. Each of the answers 66–72 in this mode is preceded by a designated letter A-D corresponding to one of the buttons 18–24. In other words, after step 232, the screen 16 displays the texts shown in FIG. 8.

As can be seen from FIG. 8, the question text 64 itself is assigned a number (in this case '1'). Importantly, the order of the answer texts 66–72 are preferably scrambled so that the correct answer may be designated arbitrarily as answer A, B, C (as it is the case in FIG. 8) or D. This may be accomplished either by initially designating for example the first of four answer texts as the correct answer 66 and having the microprocessor 44 scramble the order of the answer texts or by arranging the answer texts in a random order in ROM 60. In the latter case, the microprocessor is provided with a list. In the indicating the correct answer text corresponding to each question text.

As previously mentioned, the last line of screen 16 is reserved for instructions. In FIG. 8, the instruction text 84 indicates that if the user wants to review the narrative text 62 describing the particular situation addressed by question text 64 he must press button E. The numbers on the left side of the line indicate that this is question 1 of 40 in this test.

In S 236 the apparatus waits for an answer. If E is selected, the apparatus goes back to S 230 to re-display the narrative text 62. If an answer is received, in S 238 the answer is analyzed and tabulated with the previous answers (if any). If in step S 236 an answer is not received within a preselected duration, an incorrect answer is tabulated in step S 238.

The user than has a choice of going on to the next question (S 244) by pressing one of the function buttons. Alternatively, the user may press the highlight button 40 (S 246) to show the explanation text associated with the selected answer. The user has further the choice of pressing the score button 38 (S 248) in which case the number of correct answers and the number of total answered questions is displayed. At the end of the test, the user may also select to review all the questions which were answered wrong or were left unanswered (S 250).

As can be seen from the above description, the present invention provides an electronic study guide which is extremely flexible so that it can be used for the study and testing a wide variety of subjects. The applicants envision that the cartridges will be made by different vendors depending on the subject matter. Each such vendor is able to tailor the operation of the apparatus by providing the appropriate operating program in ROM 58. The cartridges for different subjects from the same vendor may therefore contain the same program in ROM 58. Since the textual material is stored in ROM 60, this material maybe changed, updated or otherwise edited at will without disturbing the operational program. This may be done for example by changing the ROM 60 itself, or by providing an erasable memory device such as an EEPROM.

The method of operation described above is defined by a program stored in ROM 58. Obviously, the program may be changed to tailor the operation of the apparatus for different types of tests. Moreover, the program stored in ROM 58 may be used to define the functions of all the buttons. If a touch sensitive screen is used than the screen displays a circle, bullet or other symbols illustrative of a button and the user selects an answer or a command by touching the screen itself rather than activating a button.

In summary, the present invention provides a study guide in the form of an inexpensive, portable device which offers interactive education. More particularly the invention provides the following advantages:

A. A person can study independently, at his own pace.

B. Instant access to rationales saves time by eliminating the need to look up information in text books. Furthermore, frequently students do not know where to look for information. The subject device can specifically direct the student to the appropriate text and pages for more detailed information.

C. Accurate self evaluation is an important feature. People can isolate their weak areas, and remediate, or solve their weaknesses. Printed materials allow a person to fool themselves into thinking they might have known the answers. The subject device stops the student from proceeding until the correct answer is shown. Because answers are randomized, a person is forced to accurately evaluate himself each time he changes a curriculum.

The apparatus disclosed herein is thus ideally suited for studying a subject material, for reviewing a subject or for taking a test for a subject. The apparatus is also suited for testing since it ideally recreates a test environment, i.e. the conditions under which tests are being taken.

Obviously numerous modifications may be made to this invention without departing form its scope as defined in the appended claims.

We claim:

1. An apparatus comprising:

a housing sized to fit in a hand;

display means supported by said housing for displaying textual material including a narrative text and question text and several answer texts associated with said narrative text, said answer texts consisting of a correct answer text and an incorrect answer text;

a plurality of pushbuttons disposed on said housing, each pushbutton being associated with one of said answer texts; and analyzing means for analyzing if one pushbutton depressed by a user corresponds to said correct answer text; and means disposed on said housing for selecting to re-display said narrative text on said display means after the display of the question and answer texts.

2. The apparatus of claim 1 further comprising data storage means for storing said textual material.

3. The apparatus of claim 2 further comprising a cartridge removably attached to said housing, said data storage means being disposed in said cartridge.

4. The apparatus of claim 3 further comprising microprocessor means disposed in said housing.

5. The apparatus of claim 3 wherein said data storage means further includes information defining a program for operating said microprocessor.

6. A study aid apparatus including a housing constructed to fit in a user's hand, said housing comprising:

a data storage media containing textual material, said textual material including a plurality of question texts and a plurality of answer texts associated with each question text, each question text being associated with a correct answer text and several incorrect answer texts and a narrative text providing background information for said question texts;

display means electrically connected to said data storage media for displaying one of said questions and the answer texts corresponding to said one question and displaying said narrative text prior to displaying said question texts;

a plurality of pushbuttons disposed on said housing for selecting one of said answer texts, each pushbutton being designated to correspond to one of said answer texts;

analyzing means electrically connected to said data storage media, said display means and said plurality of pushbuttons for determining if a selected pushbutton selected by a user is associated with said correct answer text; and means disposed on said housing for selecting to re-display said narrative text on said display means after the display of the question and answer texts.

7. The apparatus of claim 6 wherein said textual material further includes a narrative text providing background for said question texts, and wherein said display means displays said narrative text prior to said question texts.

8. The apparatus of claim 6 wherein said textual material further includes a plurality of explanation texts, each explanation text corresponding to one of said answer texts, and wherein said plurality of pushbuttons includes one associated with the display of an explanation text and wherein said display means display said explanation text selectively after said pushbutton is depressed.

9. The apparatus of claim 6 wherein said housing further comprises tabulating means electrically connected to said analyzing means for tabulating a number of correct answer texts selected with said pushbuttons and the total number of question texts displayed.

10. The apparatus of claim 9 wherein said housing further comprises score means electrically connected to said tabulation means for selectively displaying a score dependent thereon.

11. An apparatus comprising:

a housing sized to fit in a user's hand;

display means support by said housing for displaying textual material including question text an several answer text consisting of a correct answer text and an incorrect answer text and a narrative text providing background information for said question text;

selection means disposed on said housing for selecting one of said answer texts;

analyzing means disposed within said housing and electrically connected to said plurality of pushbuttons and display means for analyzing if one selected answer text selected by said user using said selection mean corresponds to said correct answer text; and means disposed on said housing for selecting to re-display said narrative text on said display means after the display of said question text and answerer texts.

12. The apparatus of claim 1 further comprising data storage means disposed within said housing and electrically connected to said storage means for storing said textual material.

13. The apparatus of claim 12 further comprising a cartridge removably attached to said housing, said data storage means being disposed in said cartridge.

14. The apparatus of claim 13 further comprising microprocessor means disposed in said housing and electrically connected to said data storage means, analyzing means and display means.

15. The apparatus of claim 13 wherein said data storage means further includes information defining a program for operating said microprocessor.

* * * * *